United States Patent [19]

Pollard et al.

[11] 4,215,403
[45] Jul. 29, 1980

[54] ACTIVE SUSPENSIONS FOR VEHICLES

[75] Inventors: Maurice G. Pollard; Roger M. Goodall, both of Derby, England

[73] Assignee: British Railways Board, London, England

[21] Appl. No.: 936,305

[22] Filed: Aug. 23, 1978

[30] Foreign Application Priority Data

Oct. 25, 1977 [GB] United Kingdom ............... 44274/77

[51] Int. Cl.² ...................... B60G 25/00; G05B 11/40
[52] U.S. Cl. ..................................... 364/424; 280/707; 318/617
[58] Field of Search ...................... 364/424, 425, 426; 318/585, 586, 587, 590, 615, 616, 617, 618, 637; 280/707

[56] References Cited

U.S. PATENT DOCUMENTS

| | | | |
|---|---|---|---|
| 2,901,680 | 8/1959 | Goldman, Jr. | 318/617 |
| 2,940,026 | 6/1960 | Raque | 318/617 |
| 3,351,829 | 11/1967 | Qvarnström | 318/615 |
| 3,699,989 | 10/1972 | O'Connor et al. | 318/615 |
| 3,995,883 | 12/1976 | Glaze | 280/707 |
| 4,064,444 | 12/1977 | Hoang | 318/615 |
| 4,065,154 | 12/1977 | Glaze | 280/707 |
| 4,148,452 | 4/1979 | Niessen et al. | 318/585 |

*Primary Examiner*—Felix D. Gruber
*Attorney, Agent, or Firm*—Pollock, Vande Sande and Priddy

[57] ABSTRACT

An active suspension for a vehicle, in particular an active tilting suspension for a railway vehicle, has a first main control loop in which a deficiency signal indicative of the difference actuator response and demand is fed through a low-pass filter to control operation of the actuator. A second control loop derives a restraining signal from actuator operation and this restraining signal is fed through a high-pass filter, which is substantially complementary to the aforesaid low-pass filter, to provide a restraining control on the actuator.

5 Claims, 1 Drawing Figure

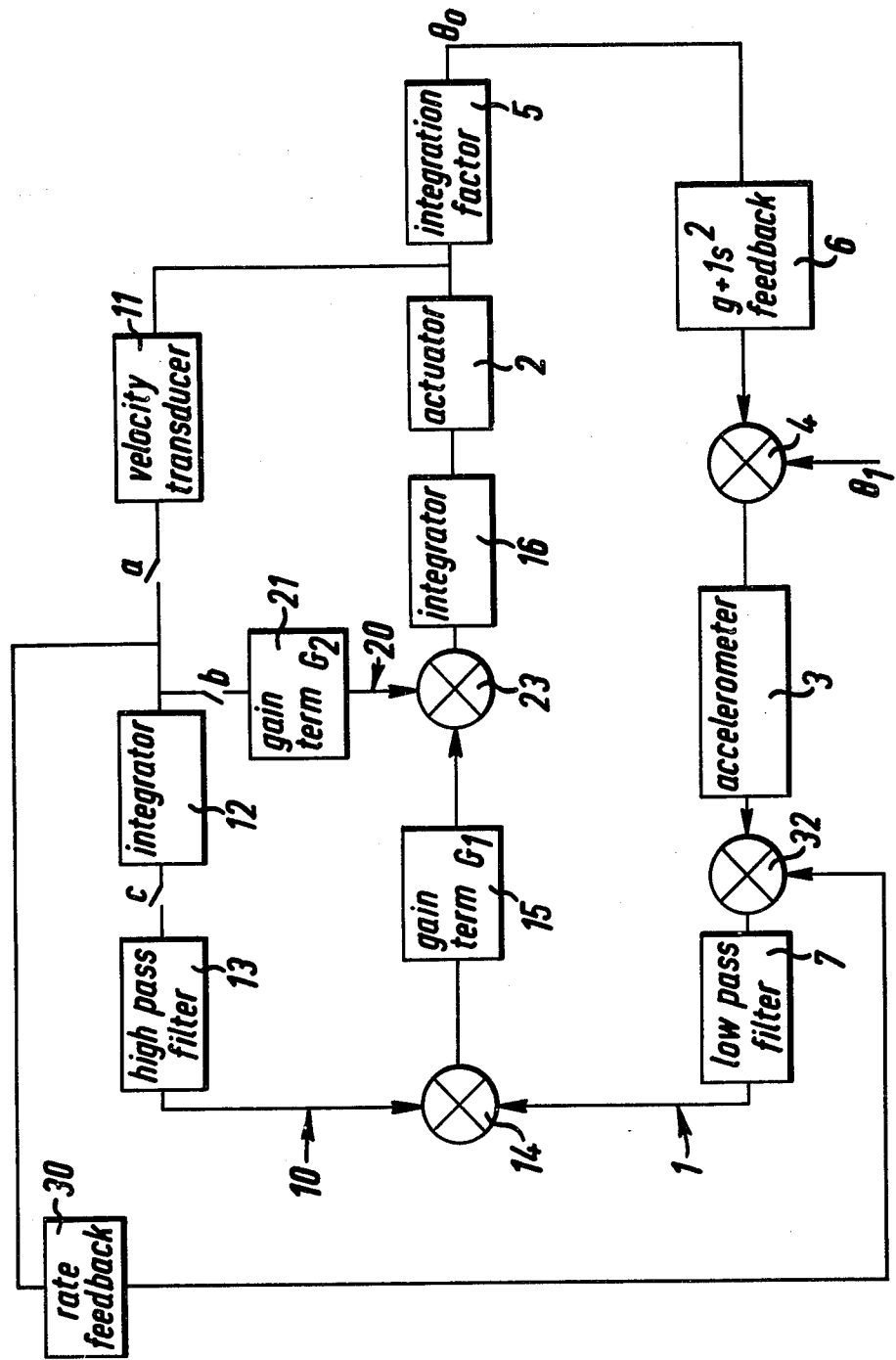

ACTIVE SUSPENSIONS FOR VEHICLES

The present invention relates to active suspensions for vehicles. By the term "suspension" is meant any arrangement which is used to control one or more ride characteristics of the vehicle.

A suspension for a vehicle must provide two basic requirements, namely:
(a) Under steady conditions and at low frequencies the suspension must cause the vehicle to follow a guide-line (e.g. road surface, railway track, wire etc) or maintain a predetermined relationship with a guiding factor (e.g. gravity, inertial reference, etc).
(b) At high frequencies the suspension must provide isolation of the vehicle body both from the irregularities of the guide-line and from undesired signals associated with the guiding factor.

Various spring and damper suspensions are used in most applications to provide these functions. However, in some circumstances an active (controlled) suspension is necessary, or may offer benefits which cannot be provided by a passive (uncontrolled) suspension. For such an active suspension there is a further requirement that is considered to be essential to ensure reliable operation, a necessity for its inclusion in a transport system. This is that significant changes in the parameters of the suspension must cause insignificant changes in stability margins and only small changes in the dynamic response.

It is the object of the present invention to provide an active suspension which meets these requirements.

According to the present invention an active suspension for a vehicle comprises:
(a) a main control loop including a suspension actuator, said loop receiving an input signal representative of a suspension demand and deriving a feed back signal representative of the response of said actuator to said demand, said input and feed back signals being compared in said loop to provide a deficiency signal indicative of the deficiency between said demand and the response of said actuator, said deficiency signal being fed through a low-pass filter to control operation of said actuator, and
(b) a second control loop providing a restraining signal for restraining operation of said actuator, said restraining signal being derived from a suspension parameter which varies with operation of said actuator and being fed through a high pass filter, which is substantially complementary to said low-pass filter, to provide a restraining control on said actuator, said deficiency signal and said restraining signal being compared after passing said low-pass and high-pass filters respectively, to provide a resultant signal for controlling said actuator.

The invention has advantageous application in the tilting arrangement of a railway vehicle in which the vehicle body is tilted relatively to the wheelsets to compensate for cant deficiency in the track as the railway vehicle is negotiating curves in the track. Thus the actuator is mounted to tilt the vehicle body relatively to the wheelset about a tilt axis extending longitudinally of the vehicle body and is controlled so that it tilts the vehicle body to maintain zero lateral acceleration on the vehicle body in response to low frequency input signals but is positively restrained against responding to high frequency signals.

The invention will now be described in more detail by way of example and in the context of a tilting arrangement of a railway vehicle for correcting for cant deficiency. A schematic block diagram of the tilting arrangement is shown in the accompanying drawing.

Referring to the drawing the tilting arrangement has a main control loop 1 which performs the prime control function. The loop 1 includes a tilting actuator 2 which comprises for example a hydraulic jack and associated servo-control valve system. A feed back signal indicative of the angle $\theta_o$ to which the body has already been tilted acts on an accelerometer 3 in opposition to an input signal indicative of the angle $\theta_1$ to which the body should be tilted from an absolute datum to correct for cant deficiency. An electrical output signal from the accelerometer 3 is thus representative of the deficiency between the actual tilt and the demanded tilt. In actuality the input signal fed to the accelerometer 3 is the resultant lateral acceleration acting on the vehicle body at the accelerometer location with the body tilted at the angle $\theta_o$. In the schematic block diagram this input signal is shown as being derived by adding in adder 4 a positive signal representative of the angle $\theta_1$ to a negative signal representative of the angle $\theta_o$ derived from the actuator 2 as a velocity signal then integrated in integrator 5 and then operated on in unit 6 by operator $(g+ls^2)$, g being gravitational acceleration, l being the distance of the accelerometer from the tilt axis and $s^2$ being a differential operator. Thus the output signal from unit 6 is representative of $(g\theta + l\ddot{\theta}_o)$. If the accelerometer could be mounted on the tilt axis the undesirable term $l\ddot{\theta}_o$ would be zero, but space does not usually permit this. The deficiency signal from the accelerometer 3 is fed through a low-pass filter 7 to control the operation of the actuator 2 as will be described to correct for cant deficiency.

The tilting arrangement has a second control loop 10 for monitoring the high frequency performance of the tilting arrangement and acting to positively restrain operation of the actuator 2. The loop 10 derives a feed back signal indicative of the displacement of the vehicle body produced by the actuator 2. In the block diagram this is shown as being derived from the output of the actuator 2 by a velocity transducer 11, which is for example physically connected across the actuator 2 and whose output is integrated in self-zeroing integrator 12; it could however be equally well obtained directly from a displacement transducer. The output from the integrator 12 is fed through a high-pass filter 13 to provide a restraining control signal to the actuator 2 in conjunction with the discrepancy signal from the accelerometer 3. Thus a positive discrepancy signal is added to a negative restraining signal in adder 14. The resultant signal from adder 14 is fed to the actuator 2 via multiplying unit 15 which introduces a gain term $G_1$ into the resultant signal, and integrator 16, whose increasing output with time improves the response rate of the actuator 2 without altering the loop gain.

The high pass filter 13 is substantially complementary to the low-pass filter 7 so that the main loop gain can be increased to a desired value without worrying about filter frequencies and the filter frequencies can be altered at will to suit the dynamic requirements without recourse to the stability criteria of the main loop. Thus since the filters 7 and 13 complement each other, they give a net unity gain and a zero phase shift through the frequency range. It will be appreciated that they need not be an exactly complementary pair; indeed, various benefits may accrue from detuning them slightly by modifying the filters to produce emphasis on various elements of the feedback. It has been found that a filter response that is basically a "Butterworth Response" is very suitable. If the bandwidth of the cirucit is sufficiently large with respect to the frequency of the complementary filters then the filters, to the first order, define the response of the suspension. It should be a design aim to make the bandwidth reasonably high. The filter frequency is chosen to give a good ride and in this example a value between 0.3 Hz and 0.6 Hz has been chosen. There is no reason why values outside this range should not be chosen for a different application. The main-loop bandwidth in the example is in the range 1–2 Hz but again any value can be chosen between the filter frequency and the bandwidth of the third control loop referred to below.

The tilting arrangement also has a third control loop 20 which derives a feed back signal from the velocity transducer 11 and feeds it via a multiplying unit 21, which introduces a gain term $G_2$, to an adder 23 where it is added as a negative signal to the positive signal from multiplier 15. The third control loop therefore modifies the operation of the actuator 2, to vary its response if the actuator 2 is not satisfying its requirements. Thus the third loop tidies up the response of the actuator 2 to ensure close correlation between output and demand. In the case of an hydraulic actuator it therefore overcomes hydraulic resonances and non-linearities in the pipework and valves.

The third loop is designed to have a fast response and in addition to the provision of the multiplier 21 to achieve this, it may also incorporate an integrator. The bandwidth of the third loop as implied above must be higher than the main loop.

A further feed-back control may be derived from the velocity transducer 11 and is fed via rate feedback unit 30 as a negative signal to adder 32, where it is summed with the positive discrepancy signal from accelerometer 3 to introduce a rate response factor into the discrepancy signal. It has been found that this rate feedback signal negates to some extent the undesirable $l\ddot{\theta}$ term introduced into the feed-back signal from the actuator 2.

Although in the above example the invention has been described in the context of a tilting arrangement of a railway vehicle it has other suspension applications.

The combination of (a) the main loop (b) the second loop with its complementary filer to the filter of the main loop to provide the required dynamic response and (c) the third loop, driven by the main loop, both in the example described above and in the other applications of the invention has the following benefits:
 (i) The stability and gain requirements can be met independently of other considerations.
 (ii) The dynamic requirements can be achieved by simply changing the complementary filters. To a first order the suspension response is the same as that of the low pass filter. This feature is modified, in the example, by the term $(g+ls^2)$ and emphasizes that physical constraints imposed on the system do not negate the control philosophy.
 (iii) The response of the suspension to force inputs is very rapid whereas the response to track inputs, $\theta_1$ in the example, is defined by the filter. Specific examples are (a) a very rapid self levelling system and (b) a response to roll torques equivalent to a stiff anti-roll bar without the disadvantages of such a mechanism.

In the example a velocity transducer is used to measure relative velocity between the bogie and a tilting member. This transducer can be of any form providing the frequency response is adequate. Similarly for the general case there is no requirement for the transducer to have any specific form.

In the example the value $\theta_o$ is measured by an accelerometer. Again this could be any device which measured $\theta_o$ with an adequate frequency response. In other manifestations of the invention the transducer in the main loop might be a gap measuring device, the form of the transducer is not significant to the control concept.

Additional loops can be added to this control system to improve, or modify various aspects of the system and an example shown is a velocity feedback into the low-pass filter.

The box in the example marked "Actuator" contains many non-linearities which are controlled particularly by the third control loop. The system is adaptable to accommodate any non-linearity with an appropriate loop around it and other examples might be air-spring behaviour, electro-magnetic inductance, the effect of resilience in the actuator mounting etc.

We claim:

1. An active suspension system for a vehicle comprising:
 (a) a main control loop including a suspension actuator, said loop including first comparator means for receiving an input signal representative of a suspension demand and a feed back signal representative of the response of said actuator to said demand, said input and feed back signals being compared in said first comparator means to provide a deficiency signal indicative of the deficiency between said demand and the response of said actuator, and a low-pass filter in said main control loop through which said deficiency signal passes, and
 (b) a second control loop providing a restraining signal for restraining operation of said actuator, said second loop comprising means for deriving said restraining signal from a suspension parameter which varies with operation of said actuator, and a high pass filter in said second control loop through which said restraining signal is passed and which is substantially complementary to said low-pass filter, and
 (c) second comparator means coupled to said main control loop and to said second control loop for comparing said deficiency signal and said restraining signal after said signals have passed through said low-pass and high-pass filters respectively, and operative in response to said comparison to provide a resultant signal for controlling said actuator.

2. A suspension system for a vehicle according to claim 1, including a third control loop operative to modify said resultant signal from said second comparator means in dependence upon the response of said actuator to said resultant signal.

3. A suspension system for a vehicle according to claim 1 including menas for deriving a further feedback signal which is indicative of the rate of response of said actuator, and means responsive to said further feedback signal for modifying said deficiency signal before it is fed to said low-pass filter in said main control loop.

4. A suspension system for a vehicle according to claim 1 wherein said vehicle is a railway vehicle whose body is adapted to be tilted relatively to the wheelsets thereof to compensate for a deficiency in the railway track as the vehicle is negotiating curves in the track, said actuator comprising a tilting actuator for tilting said vehicle body about its longitudinal axis, and said first comparator means comprising an accelerometer mounted on said vehicle body to detect lateral acceleration of said vehicle body.

5. A suspension system for a vehicle according to claim 4, wherein said means for deriving said restraining signal comprises transducer means for detecting the displacement of the vehicle body produced by said tilting actuator.

* * * * *